Figure 1:
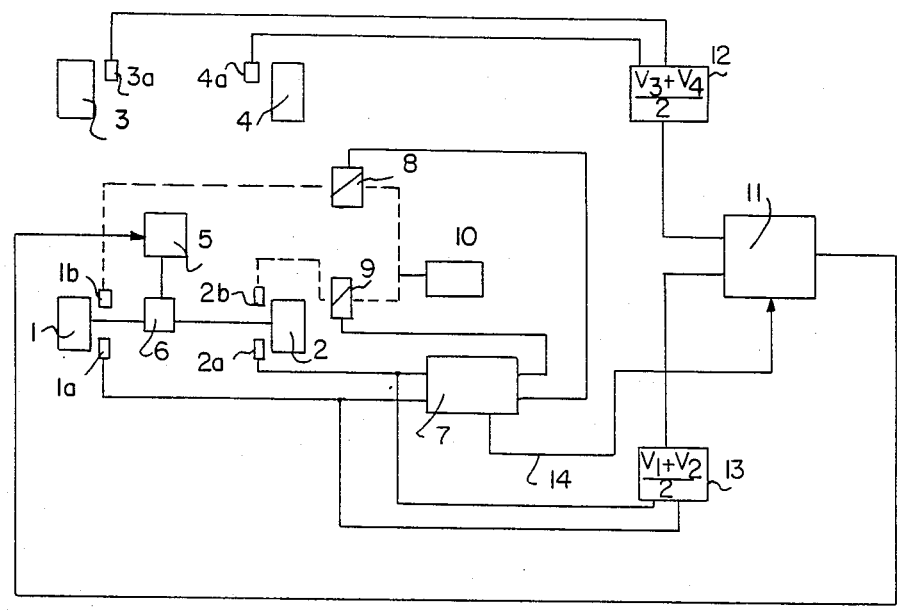

United States Patent [19]

Kopper et al.

[11] Patent Number: 4,950,037
[45] Date of Patent: Aug. 21, 1990

[54] DRIVE SLIP REGULATING SYSTEM

[75] Inventors: Werner Kopper, Brighton, Mich.; Rudiger Frank, Luttelforst, Fed. Rep. of Germany; Herbert Schramm, Stuttgart, Fed. Rep. of Germany; Dieter Worner, Pleidelsheim, Fed. Rep. of Germany; Hubert Moller, Stuttgart, Fed. Rep. of Germany

[73] Assignee: Robert Bosch GmbH, Stuttgart, Fed. Rep. of Germany

[21] Appl. No.: 455,803

[22] Filed: Dec. 26, 1989

Related U.S. Application Data

[63] Continuation of Ser. No. 284,570, Dec. 15, 1988, abandoned, which is a continuation of Ser. No. 82,406, filed as PCT EP86/00626 on Oct. 30, 1986, published as WO87/02948 on May 21, 1987, abandoned.

[30] Foreign Application Priority Data

Nov. 16, 1985 [DE] Fed. Rep. of Germany ....... 3540708

[51] Int. Cl.⁵ ............................ B60T 8/00; B60T 8/60; B60K 28/16
[52] U.S. Cl. ................................. 303/110; 188/181 C; 303/96; 303/100; 303/103; 303/111; 180/197; 364/426.01
[58] Field of Search ...................... 303/91, 96, 99, 100, 303/102, 103, 110, 111, 95, 98, 105, 106, DIG. 3, DIG. 4; 180/197, 282, 283, 284; 188/181 R, 181 C; 364/426.01, 426.02, 426.03

[56] References Cited

U.S. PATENT DOCUMENTS 3,867,647  2/1975  Callahan et al. .................. 303/91 X
3,938,612  2/1976  Boudeville et al. ................. 180/197
3,953,083  4/1976  Latvala et al. ....................... 303/103
4,036,536  7/1977  Quan .................................... 303/105
4,042,059  8/1977  Bertolasi ............................. 180/197
4,503,611  4/1986  Frank et al. ......................... 180/197
4,576,419  3/1986  Leiber .................................. 303/100
4,722,411  2/1988  Ohashi et al. ....................... 180/197
4,749,239  6/1988  Onogi et al. ..................... 303/100 X
4,761,741  8/1988  Agarual et al. ................. 180/197 X
4,762,196  8/1988  Harada et al. ..................... 303/106 x

FOREIGN PATENT DOCUMENTS 0064669  11/1982  European Pat. Off. .
1806671   7/1970  Fed. Rep. of Germany .
2701567   7/1978  Fed. Rep. of Germany .
3337664   5/1985  Fed. Rep. of Germany .
3417089  11/1985  Fed. Rep. of Germany .
2151885   4/1973  France .
2509242   1/1983  France .
2534198   4/1984  France .
0013256   2/1981  Japan .
1177502   1/1970  United Kingdom .
2128278   4/1974  United Kingdom .

Primary Examiner—Douglas C. Butler
Attorney, Agent, or Firm—Edwin E. Greigg

[57] ABSTRACT

A drive slip regulating system is described, in which the speeds of the drive wheels are compared with one another and as a function of the deviation Δ v a set-point brake pressure is calculated, with which the excessively spinning wheel is to be braked. In the pulsed furnishing of the brake pressure, the valve opening times are calculated, taking the pressure buildup function into account, in such a way that the actual brake pressure corresponds to the set-point brake pressure.

14 Claims, 2 Drawing Sheets

DRIVE SLIP REGULATING SYSTEM

This is a continuation of co-pending application Ser. No. 284,570 filed Dec. 15, 1988, which is a continuation of Ser. No. 082,406 filed as PCT EP86/00626 on Oct. 30, 1986, published as WO87/02948 on May 21, 1987, but now abandoned.

The invention relates to a drive slip regulating system.

PRIOR ART

Drive slip regulating systems are known (for example, from German patent disclosure document DE-OS No. 31 27 302), to which U.S. Pat. No. 4,484,280 to Brugger et al corresponds, which have a brake regulator and an engine moment regulator. In these regulators, the wheel speeds of the driven wheels and non-driven wheels are measured. From the wheel speed signals of the non-driven wheels, a reference variable is obtained, by averaging, for example, with which the wheel speed signals of the driven wheels are compared. If one of the wheel speeds of the driven wheels deviates from the reference variable by a predetermined amount (if it exceeds a threshold), then this wheel is braked. If both wheel speed signals differ by a predetermined amount from the wheel speed, then the engine moment is reduced.

ADVANTAGES OF THE INVENTION

The invention differs from this prior art in two ways. First, with the brake regulator the other driven wheel serves as a comparison variable, and second, no slip threshold is predetermined for the brake regulator; instead, the deviation of the speeds of the wheels from one another is ascertained continuously, and the brake pressure with which the wheel exhibiting the deviation should be braked is calculated continuously as a function of this deviation, and the corresponding brake pressure is provided. This is done by triggering the respective valves with pulses; the width of the opening pulse is ascertained taking the set-point pressure and the predetermined pressure buildup function into account.

Further advantages and embodiments of the invention will become apparent from the drawing description.

DRAWING DESCRIPTION

An exemplary embodiment of the invention will be explained, referring to the drawing. Shown are:

FIG. 1, a basic structure of an exemplary embodiment of a regulator according to the invention;

FIGS. 2, 3, 4, 5 and 6, diagrams for explaining the mode of operation.

In FIG. 1, reference numerals 1 and 2 identify the wheels of a vehicle that are driven by an engine 5 via a differential 6, while reference numerals 3 and 4 identify the non-driven wheels. Measured value transducers 1a, 2a, 3a and 4a for determining the wheel speed are assigned to all the wheels. The wheel brakes of the rear wheels are also shown in block form and labeled 1b and 2b.

Figure 2:
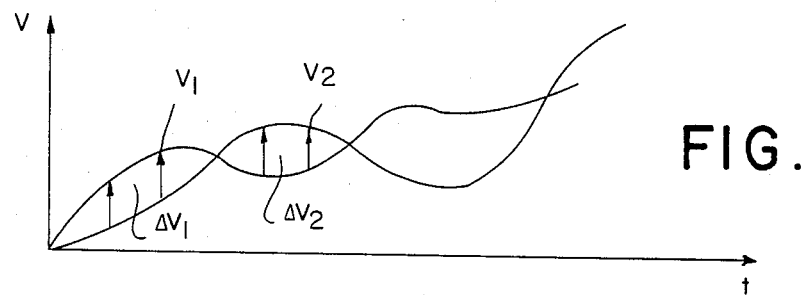
Figure 3:
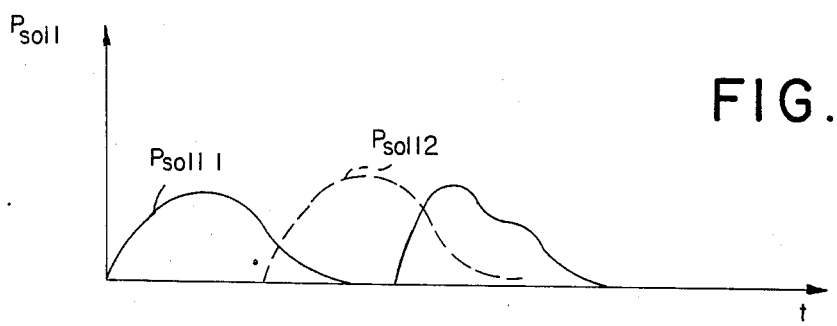

The speed signals of the measured value transducers 1a and 2a are supplied to a brake regulator 7. In this brake regulator, the two wheel speeds $v_1$ and $v_2$, the courses of which are plotted by way of example in FIG. 2, are compared with one another, and the respective deviations $\Delta v_1$ and $\Delta v_2$ are ascertained. As can be seen in FIG. 2, deviation $\Delta v_1$ is produced when the speed $v_1$ of wheel 1 is greater than the speed $v_2$ of wheel 2, and, similarly, deviation $\Delta v_2$ is produced when speed $v_2$ is greater than $v_1$. Whenever the speed of one driven wheel exceeds the speed of the other, there is a predetermined optimum brake pressure which should be applied to the faster wheel to minimize wheel slippage. This optimum brake pressure is referred to herein as the set-point brake pressure $P_{soll}$. As can be seen from FIGS. 2 and 3, set-point brake pressure $P_{soll\,1}$ for wheel 1 is a predetermined function of $\Delta v_1$ and set-point brake pressure $P_{soll\,2}$ for wheel 2 is a predetermined function of $\Delta v_2$. Regulator 7, which may have proportional-integral-derivative (PID) characteristics, produces $P_{soll\,1}$ and $P_{soll\,2}$ from $\Delta v_1$ and $\Delta v_2$, respectively, in accordance with a predetermined algorithm.

Figure 4:
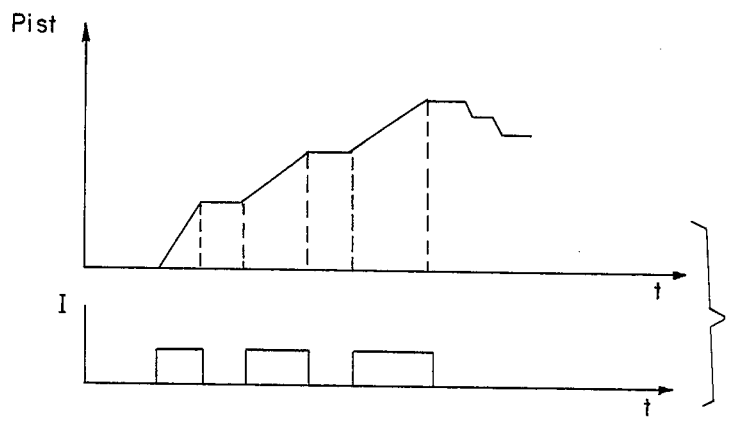
Figure 5:
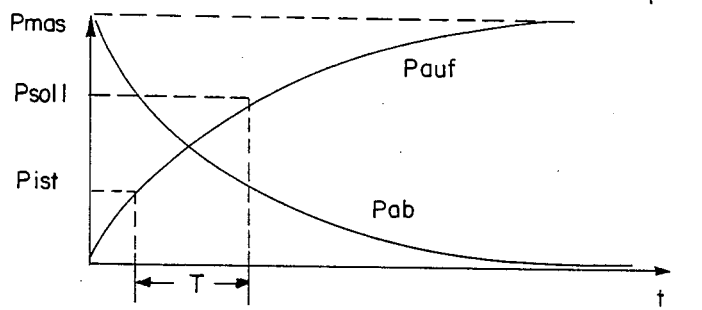

Also in regulator 7, taking into account the derived set-point brake pressure $P_{sole}$, a maximum pressure $P_{max}$ predetermined for braking in order to avoid drive slip, and the predetermined courses of the pressure buildup ($P_{auf}$) and pressure reduction ($P_{ab}$) functions versus time as shown is, pulse widths are calculated, with which brake pressure control valves 8 or 9 must be triggered in order to cause the actual brake pressure $P_{ist}$ to attain the particular set-point brake pressure $P_{Soll}$. This is best understood by reference to FIGS. 4 and 5. FIG. 4 shows the actual brake pressure $P_{ist}$ for one of the driven wheels plotted against time and also shows how the actual pressure is built up during each trigger pulse I shown below the $P_{ist}$ plot. In order to determine the width of each of these trigger pulses for causing the build-up, the predetermined pressure build-up function $P_{auf}$ shown in FIG. 5 is used. This function shows how the brake pressure will actually build up if a predetermined maximum pressure $P_{max}$ from pressure source 10 is connected to the brake through an open control valve 8 or 9. Similarly, if a set-point brake pressure $P_{soll}$ is lower than the current actual brake pressure $P_{ist}$, the predetermined pressure reduction function $P_{ab}$ in FIG. 5 is used. This function shows how the actual brake pressure will be reduced. The $P_{auf}$ and $P_{ab}$ functions as well as $P_{max}$ are predetermined by taking into account all pertinent factors in an actual operating system.

To accomplish this control of actual brake pressure $P_{ist}$, a pressure source 10 is provided having the maximum brake pressure $P_{max}$ for this situation (for example, 10 bar). The valves 8 and 9 are three-position valves, for example, which enable (1) pressure buildup, (2) pressure reduction, and (3) maintenance of constant pressure at the wheel brakes 1b and 2b.

In addition to braking the faster drive wheel to minimize drive slip, the invention also adjusts the engine moment on the driven wheels to further reduce drive slip. To accomplish this result, an engine moment regulator 11 is provided; this regulator 11 is preceded by blocks 12 and 13, to which the wheel speed signals of the non-driven wheels (block 12) and the driven wheels (block 13) are supplied and which from the wheel speeds $v_1$ and $v_2$ or $v_3$ and $v_4$, respectively, ascertain mean values $$\frac{v_1 + v_2}{2}, \text{ or } \frac{v_3 + v_4}{2},$$

or other linear combinations.

Figure 6:
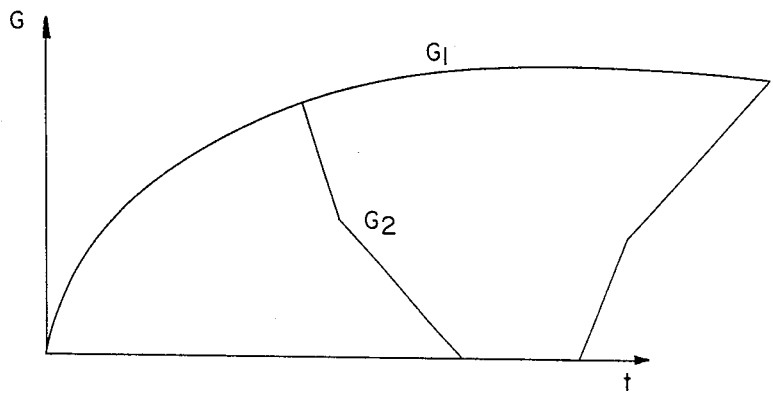

The regulator 11, which compares these mean (or other) values, has integral (1) or proportional-integral (PI) characteristics. It controls the control element for the engine moment such that the position of the control element (for example, a throttle valve or governor rod) that is integrated into the engine block 5 is adjusted initially with a relatively steep slope and then with a lesser slope. This is shown in FIG. 6, in which the position of the gas pedal G is plotted over time. The course $G_1$ is specified by the driver of the vehicle, while $G_2$ represents the intervention of the governor.

Once the drive slip has lessened, then the control element is returned, with a variable slope, to the position specified by the driver. Again, the slope may be steep at first and more gradual later to avoid overshoot.

The regulator 7 knows the wheel speeds $v_1$ and $v_2$ and the brake pressure $P_{ist}$ attained from the set-point brake pressure and from these variables can determine an estimated temperature at the brakes. If this estimated temperature exceeds a threshold, then via line 14 a signal is fed to the regulator 11, which then reduces the engine moment for a time. With the excess estimated temperature signal, the drive slip regulator could also be switched off as a whole, or both provisions could be combined at different thresholds.

We claim:

1. A drive slip regulating system of a vehicle including driven and non-driven wheels, which includes means for measuring the wheel speeds of the driven wheels, means for generating drive slip regulating signals from a comparison of the driven wheel speeds, control valves (8, 9) controlled by means of the drive slip regulating signals for controlling the actual brake pressure at the individual driven wheels so as to reduce the drive slip, said means for generating drive slip regulating signals including means for comparing the wheel speeds of the driven wheels and ascertaining deviations between the speeds, means for continuously at brief intervals determining a set-point brake pressure $P_{soll}$ from the ascertained deviations, and means using said set-point brake pressure and a brake pressure build-up function $P_{auf}$ to produce the drive slip regulating signals, said drive slip regulating signals being variable time length trigger signals for controlling the control valves which control the build-up time of the actual brake pressure so that the actual brake pressure continuously at brief intervals attains the most recently determined set-point brake pressure and thus drive slip is reduced.

2. A drive slip regulating system as defined by claim 1, which includes an engine moment regulator (11), in which the wheel speed signals ($v_1$, $v_2$) of the driven wheels (1, 2) are compared with at least one signal from the non-driven wheels (3, 4), and in which an engine moment reduction is performed whenever at least one of the wheel speed signals ($v_1$, $v_2$) of the driven wheels (1, 2) deviate, in the fashion of a drive slip, by a predetermined amount from the at least one signal of the non-driven wheels (3, 4).

3. A drive slip regulating system as defined by claim 2 which includes means for determining the sum of the speed signals ($v_1$, $v_2$) of the driven wheels (1, 2) which are compared with the sum of the speed signals ($v_3$, $v_4$) of the non-driven wheels.

4. A drive slip regulating system as defined by claim 2 in which said engine moment regulator (11) has integral (I) characteristics.

5. A drive slip regulating system as defined by claim 1 which includes means for adjusting the position of a device for determining the engine moment upon engine moment reduction which means is adjusted first with a predetermined high rate of change and subsequently at at least a lesser rate of change.

6. A drive slip regulating system as defined by claim 1 in which said means using said set-point brake pressure $P_{soll}$ also uses a pressure reduction function $P_{ab}$.

7. A drive slip regulating system as defined by claim 1 in which said means for continuously at brief intervals determining a set-point brake pressure has proportional-integral-derivative (PID) characteristics.

8. A method of regulating a drive slip system of a vehicle including driven and non-driven wheels which comprises: measuring the wheel speeds of the driven wheels; comparing the wheel speed signals ($v_1$, $v_2$) of the driven wheels with one another; ascertaining any wheel speed signal deviation ($\Delta v_1 = v_1 - v_2$ or $\Delta v_2 = v_2 - v_1$); determining a set-point brake pressure $P_{Soll}$ for at least one of the driven wheels as a predetermined function of said deviation, which set-point pressure is the pressure with which the wheel should be braked to avoid drive slip; generating a drive slip regulating signal of determined length, said length being suitable to change the brake pressure to said set-point brake pressure, said length being determined by taking into account the brake pressure, said set-point brake pressure and a predetermined brake pressure build-up function $P_{auf}$; applying said regulating signal to at least one control valve to control the brake pressure of said at least one wheel, so that said brake pressure becomes equal to said determined set-point brake pressure $P_{Soll}$; and continuously repeating at brief intervals the steps of generating a regulating signal and applying it to said at least one control valve so that said brake pressure is continuously at brief intervals brought to the most recently determined set-point pressure.

9. A method as defined by claim 8, which comprises comparing wheel speed signals ($v_1$, $v_2$) of the driven wheels (1, 2) with at least one signal from the non-driven wheels (3, 4), and performing an engine moment reduction whenever at least one of the wheel speed signals ($v_1$, $v_2$) of the driven wheels (1, 2) deviate, in the fashion of a drive slip, by a predetermined amount from the at least one signal of the non-driven wheels (3, 4).

10. A method as defined by claim 9, which comprises comparing the sum of the speed signals ($v_1$, $v_i$) of the driven wheels (1, 2) with the sum of the speed signals ($v_3$, $v_4$) of the non-driven wheels.

11. A method as defined by claim 9, which comprises adjusting a position of a device for determining an engine moment, during engine moment reduction, first with a predetermined high rate of change and subsequently at at least a lesser rate of change.

12. A method as defined by claim 11, which comprises adjusting of the engine moment in the sense of an engine moment increase, taking place following an engine moment reduction, effected first with a high rate of change and subsequently at at least a lesser rate of change.

13. A method as defined by claim 8 in which the step of generating drive slip regulating signals also takes into account a brake pressure reduction function $P_{ab}$.

14. A method as defined by claim 8 in which the means for continuously at brief intervals determining the set-point brake pressure has proportional-integral-derivative (PID) characteristics.

* * * * *